US012272950B2

(12) United States Patent
Chen et al.

(10) Patent No.: US 12,272,950 B2
(45) Date of Patent: Apr. 8, 2025

(54) METHOD AND DEVICE FOR OPTIMAL POWER FLOW CALCULATION IN POWER SYSTEMS BASED ON GENERALIZED NASH EQUILIBRIUM

(71) Applicants: STATE GRID ZHEJIANG ELECTRIC POWER CO., LTD, Zhejiang (CN); Zhejiang University, Zhejiang (CN)

(72) Inventors: Lei Chen, Hangzhou (CN); Shufeng Dong, Hangzhou (CN); Qiang Yang, Hangzhou (CN); Jun Lyu, Beijing (CN); Weiwei Xu, Hangzhou (CN); Yihui Sun, Hangzhou (CN); Chongyou Xu, Hangzhou (CN); Jingen Song, Hangzhou (CN); Weifeng Xu, Hangzhou (CN); Jun Huang, Hangzhou (CN)

(73) Assignees: STATE GRID ZHEJIANG ELECTRIC POWER CO., LTD, Hangzhou (CN); Zhejiang University, Zhejiang (CN)

( * ) Notice: Subject to any disclaimer, the term of this patent is extended or adjusted under 35 U.S.C. 154(b) by 0 days.

(21) Appl. No.: 18/538,149

(22) Filed: Dec. 13, 2023

(65) Prior Publication Data
US 2024/0213776 A1     Jun. 27, 2024

(30) Foreign Application Priority Data
Dec. 14, 2022   (CN) .......................... 202211599868.9

(51) Int. Cl.
*H02J 3/06*   (2006.01)
(52) U.S. Cl.
CPC ............. *H02J 3/06* (2013.01); *H02J 2203/20* (2020.01)

(58) Field of Classification Search
CPC ................................ H02J 3/06; H02J 2203/20
See application file for complete search history.

(56) References Cited

U.S. PATENT DOCUMENTS

| | | | | |
|---|---|---|---|---|
| 2007/0087756 | A1* | 4/2007 | Hoffberg | G06Q 10/06375 455/450 |
| 2016/0255578 | A1* | 9/2016 | Lin | H04W 52/18 455/522 |
| 2017/0160711 | A1* | 6/2017 | Wong | G05B 19/042 |

FOREIGN PATENT DOCUMENTS

| | | |
|---|---|---|
| CN | 107706921 A | 2/2018 |
| CN | 109245106 A | 1/2019 |

(Continued)

OTHER PUBLICATIONS

Yanjing Zhang, "Application of Consensus of Multi-Agent Systems for the Power Distribution in Microgrids," Thesis for the Professional Master Degree, School of North China Electric Power University, Jun. 2021.

(Continued)

*Primary Examiner* — Ziaul Karim
(74) *Attorney, Agent, or Firm* — Harness, Dickey & Pierce, P.L.C.; Stephen T. Olson (57) ABSTRACT

A method and device for optimal power flow calculation in power systems based on generalized Nash equilibrium are disclosed. The method comprises: determining first optimal power flow model corresponding to distribution network and second optimal power flow model corresponding to each microgrid; constructing a third optimal power flow model based on the first optimal power flow model, each second optimal power flow model and boundary coupling constraint condition; determining generalized Nash equilibrium solution corresponding to the third optimal power flow model; determining generalized Nash equilibrium constraint condition corresponding to collaborative objective function and (Continued)

the Nash equilibrium solution; determining fourth optimal power flow model corresponding to the collaborative objective function, with constraint condition including the generalized Nash equilibrium constraint condition; determining Pareto optimal solution corresponding to the fourth optimal power flow model to determine an optimal power flow. Accordingly, effectiveness of optimization management is improved.

10 Claims, 4 Drawing Sheets

(56) References Cited

FOREIGN PATENT DOCUMENTS

| CN | 112418493 | A |   | 2/2021  |
|----|-----------|---|---|---------|
| CN | 115204562 | A |   | 10/2022 |
| CN | 115603325 | A | * | 1/2023  |
| KR | 20210064033 | A | | 6/2021 |

OTHER PUBLICATIONS

Qi Ning, Cheng Lin, Tian Liting, et al., "Review and Prospect of Distribution Network Planning Research Considering Access of Flexible Load[J]." Automation of Electric Power Systems,2020,44(10):193-207. DOI:10.7500/AEPS2019103000.

H. Kim, J. Lee, S. Bahrami and V. W. S. Wong, "Direct Energy Trading of Microgrids in Distribution Energy Market," in IEEE Transactions on Power Systems, vol. 35, No. 1, pp. 639-651, Jan. 2020, doi: 10.1109/TPWRS.2019.2926305.

Chinese Notification to Grant Patent Right for Invention regarding Patent Application No. 202211599868.9, dated Feb. 8, 2023.

* cited by examiner

METHOD AND DEVICE FOR OPTIMAL POWER FLOW CALCULATION IN POWER SYSTEMS BASED ON GENERALIZED NASH EQUILIBRIUM

TECHNICAL FIELD

The present invention relates to the field of power systems, in particular to a method and device for optimal power flow calculation in power systems based on generalized Nash equilibrium.

BACKGROUND

Optimal Power Flow (OPF) is one of the key elements in the process of optimizing the operation and management of power systems. OPF refers to the adjustment of controllable variables, such as generator output power and tap settings of controllable transformers, to find a power distribution that meets all operational constraint conditions and optimizes a specific system performance metric, such as generation cost or network losses, so as to achieve a power flow distribution at the optimum value, given the structural parameters and load conditions of the system. Power flow refers to the steady-state distribution of voltage and power etc. in power systems.

One common type of power systems involves the collaboration between a distribution network and a microgrid, often referred to as a distribution and microgrid collaborative system. Currently, in the process of calculating the optimal power flow for such systems, it is typically assumed that the distribution network and the microgrid share the same objective, and based on this assumption, an optimal power flow model is constructed and solved.

However, in practical scenarios, many regions have distribution networks and microgrids managed by different operators. In such cases, when using existing methods to calculate the optimal power flow, it is assumed that the distribution network and the microgrid have the same objective. In reality, the interests of these two entities may not be entirely aligned. Consequently, the optimal power flow calculated under these assumptions may not represent the actual optimal solution, making it challenging to achieve the best system performance metrics and resulting in a less effective optimal management.

SUMMARY

In light of this, the embodiments of the present invention provide a method for optimal power flow calculation in power systems based on generalized Nash equilibrium. This method is designed to address the challenges of calculating the optimal power flow for distribution and microgrid collaborative power systems based on a single objective, which may fail to yield the actual optimal solution, resulting in less effective optimal management outcomes.

The embodiments of the present invention also provide a device for optimal power flow calculation in power systems based on the generalized Nash equilibrium, ensuring the practical implementation and application of the method.

To achieve the above objectives, the embodiments of the present invention provide the following technical solutions.

A method for optimal power flow calculation in power systems based on generalized Nash equilibrium comprises steps of:

determining a first optimal power flow model corresponding to a distribution network of the power systems and a second optimal power flow model corresponding to each microgrid of the power systems, in cases where the optimal power flow calculation is to be done for the power systems, wherein the first optimal power flow model is constructed based on an objective function corresponding to the distribution network, and the second optimal power flow model corresponding to each microgrid is constructed based on an objective function corresponding to the microgrid;

constructing a third optimal power flow model based on the first optimal power flow model, each second optimal power flow model, and a preset boundary coupling constraint condition, the third optimal power flow model being a generalized Nash game model;

determining a generalized Nash equilibrium solution corresponding to the third optimal power flow model;

determining a collaborative objective function corresponding to the power systems;

determining a generalized Nash equilibrium constraint condition corresponding to the collaborative objective function based on the generalized Nash equilibrium solution;

determining a fourth optimal power flow model, which is constructed based on the collaborative objective function, wherein a constraint condition of the fourth optimal power flow model comprises the generalized Nash equilibrium constraint condition;

determining a Pareto optimal solution corresponding to the fourth optimal power flow model; and determining an optimal power flow of the power systems based on the Pareto optimal solution.

Optionally, in the above method, the step of determining a first optimal power flow model corresponding to a distribution network of the power systems and a second optimal power flow model corresponding to each microgrid of the power systems comprises:

determining a first optimization objective, which is set based on the objective function corresponding to the distribution network;

determining a first feasible region corresponding to the distribution network, wherein the first feasible region is associated with a power injection of boundary nodes corresponding to the distribution network;

determining a variable constraint condition corresponding to the distribution network, wherein the variable constraint condition corresponding to the distribution network represents a range of values for optimization variables corresponding to the distribution network being the first feasible region, and the optimization variables corresponding to the distribution network include a control variable, a state variable, and a boundary node state variable corresponding to the distribution network;

using the first optimization objective and the variable constraint condition corresponding to the distribution network as the first optimal power flow model corresponding to the distribution network;

determining, for each microgrid, a second optimization objective corresponding to the microgrid, wherein the second optimization objective is set based on the objective function corresponding to the microgrid;

determining, for each microgrid, a second feasible region corresponding to the microgrid, wherein the second feasible region is associated with a state variable of a boundary node corresponding to the microgrid;

determining, for each microgrid, a variable constraint condition corresponding to the microgrid, wherein the variable constraint condition represents a range of values for optimization variables corresponding to the microgrid being the second feasible region corresponding to the microgrid, and the optimization variables corresponding to the microgrid include a control variable, a state variable, and a power injection of a boundary node corresponding to the microgrid; and using, for each microgrid, the second optimization objective and variable constraint condition corresponding to the microgrid as the second optimal power flow model corresponding to the microgrid.

Optionally, in the above method, the step of constructing a third optimal power flow model based on the first optimal power flow model, each second optimal power flow model, and a preset boundary coupling constraint condition comprises:

determining a decision variable corresponding to the distribution network;

determining a decision variable corresponding to each microgrid;

transforming model expressions of the first optimal power flow model and each second optimal power flow model to obtain a generalized Nash game expression corresponding to the first optimal power flow model and a generalized Nash game expression corresponding to each second optimal power flow model, based on the decision variable corresponding to the distribution network, the decision variable corresponding to each microgrid, and the boundary coupling constraint condition; and combining the generalized Nash game expression corresponding to the first optimal power flow model and the generalized Nash game expression corresponding to each second optimal power flow model to form the third optimal power flow model.

Optionally, in the above method, the step of determining a generalized Nash equilibrium solution corresponding to the third optimal power flow model comprises:

solving the third optimal power flow model using a preset alternating iterative algorithm to obtain a solution of the third optimal power flow model as the generalized Nash equilibrium solution.

Optionally, in the above method, the step of determining a generalized Nash equilibrium constraint condition corresponding to the collaborative objective function based on the generalized Nash equilibrium solution comprises:

determining, in the collaborative objective function, an objective subfunction corresponding to the distribution network and an objective subfunction corresponding to each microgrid;

determining an objective function value corresponding to the distribution network and an objective function value corresponding to each microgrid, based on the generalized Nash equilibrium solution;

determining a generalized Nash equilibrium constraint corresponding to the distribution network, wherein the generalized Nash equilibrium constraint corresponding to the distribution network represents a function value of the objective subfunction corresponding to the distribution network being less than or equal to the objective function value corresponding to the distribution network;

determining a generalized Nash equilibrium constraint corresponding to each microgrid, wherein the generalized Nash equilibrium constraint corresponding to each microgrid represents a function value of the objective subfunction corresponding to the microgrid being less than or equal to the objective function value corresponding to the microgrid; and using the generalized Nash equilibrium constraint corresponding to the distribution network and the generalized Nash equilibrium constraint corresponding to each microgrid as the generalized Nash equilibrium constraint condition corresponding to the collaborative objective function.

Optionally, in the above method, the step of determining a fourth optimal power flow model comprises:

determining a third optimization objective, which is set based on the collaborative objective function;

determining a global equality constraint condition and a global inequality constraint condition corresponding to the collaborative objective function; and combining the third optimization objective, the global equality constraint condition, the global inequality constraint condition, and the generalized Nash equilibrium constraint condition to form the fourth optimal power flow model.

Optionally, in the above method, the step of determining a Pareto optimal solution corresponding to the fourth optimal power flow model comprises:

solving the fourth optimal power flow model using a preset heterogeneous decomposition algorithm to obtain a solution of the fourth optimal power flow model, which is used as the Pareto optimal solution.

A device for optimal power flow calculation in power systems based on generalized Nash equilibrium comprises:

a first determination unit for determining a first optimal power flow model corresponding to a distribution network of the power systems and a second optimal power flow model corresponding to each microgrid of the power systems, in cases where the optimal power flow calculation is to be done for the power systems, wherein the first optimal power flow model is constructed based on an objective function corresponding to the distribution network, and the second optimal power flow model corresponding to each microgrid is constructed based on an objective function corresponding to the microgrid;

a construction unit for constructing a third optimal power flow model based on the first optimal power flow model, each second optimal power flow model, and a preset boundary coupling constraint condition, the third optimal power flow model being a generalized Nash game model;

a second determination unit for determining a generalized Nash equilibrium solution corresponding to the third optimal power flow model;

a third determination unit for determining a collaborative objective function corresponding to the power systems;

a fourth determination unit for determining a generalized Nash equilibrium constraint condition corresponding to the collaborative objective function based on the generalized Nash equilibrium solution;

a fifth determination unit for determining a fourth optimal power flow model, which is constructed based on the collaborative objective function, wherein a constraint condition of the fourth optimal power flow model comprises the generalized Nash equilibrium constraint condition;

a sixth determination unit for determining a Pareto optimal solution corresponding to the fourth optimal power flow model; and a seventh determination unit for determining an optimal power flow of the power systems based on the Pareto optimal solution.

In the above-mentioned device, the second determination unit optionally comprises:

a first solving subunit for solving the third optimal power flow model using a preset alternating iterative algorithm to obtain a solution of the third optimal power flow model, which is used as the generalized Nash equilibrium solution.

In the above-mentioned device, the sixth determination unit optionally comprises:

a second solving subunit for solving the fourth optimal power flow model using a preset heterogeneous decomposition algorithm to obtain a solution of the fourth optimal power flow model, which is used as the Pareto optimal solution.

The method for optimal power flow calculation in the power systems based on the generalized Nash equilibrium as provided in the embodiments of the present invention comprises the following steps: determining a first optimal power flow model corresponding to a distribution network of the power systems and a second optimal power flow model corresponding to each microgrid of the power systems, in cases where the optimal power flow calculation is to be done for the power systems, wherein the first optimal power flow model is constructed based on an objective function corresponding to the distribution network, and the second optimal power flow model corresponding to each microgrid is constructed based on an objective function corresponding to the microgrid; constructing a third optimal power flow model based on the first optimal power flow model, each second optimal power flow model, and a preset boundary coupling constraint condition, the third optimal power flow model being a generalized Nash game model; determining a generalized Nash equilibrium solution corresponding to the third optimal power flow model; determining a collaborative objective function corresponding to the power systems; determining a generalized Nash equilibrium constraint condition corresponding to the collaborative objective function based on the generalized Nash equilibrium solution; determining a fourth optimal power flow model, which is constructed based on the collaborative objective function, wherein a constraint condition of the fourth optimal power flow model comprises the generalized Nash equilibrium constraint condition; determining a Pareto optimal solution corresponding to the fourth optimal power flow model; and determining an optimal power flow of the power systems based on the Pareto optimal solution. Accordingly, the method first solve the generalized Nash equilibrium point using the non-cooperative optimal power flow model for the distribution network and microgrid. Then the generalized Nash equilibrium point is used to establish corresponding a constraint. Based on the constraint, a collaborative optimal power flow model for the distribution network and microgrid is constructed and solved to obtain the Pareto optimal point for the optimal power flow model. During the calculation of the optimal power flow, the present invention takes into consideration the individual interests of both the distribution network and microgrid while also promoting overall optimization. Thus, the calculation outcomes are closer to practical requirements, which makes for improving the effectiveness of optimization management.

BRIEF DESCRIPTION OF THE DRAWINGS

To further clarify the technical solution in the embodiments of the present invention or the prior art, the following descriptions will provide an explanation of the figures used in the embodiments or the prior art. It should be noted that the figures are only embodiments of the present invention, and those skilled in the art can derive other figures based on the provided figures without the need for creative effort.

DETAILED DESCRIPTION

The following description, in conjunction with the accompanying figures, provides a specific explanation of the technical solution in the embodiments of the present invention. It should be noted that what is described here represents only a portion of the embodiments of the present invention, and those skilled in the art can derive other embodiments based on the embodiments provided without the need for creative effort, all of which fall within the scope of protection of the present invention.

In the present application, the terms "comprise", "include" or any variations thereof are intended to encompass non-exclusive inclusion. Processes, methods, items, or devices, including a series of elements, do not only comprise these elements, but also include other elements that are not explicitly listed, or inherent elements for such processes, methods, items, or devices. In cases with additional limitations, the element specified by the statement "comprising one . . . " does not exclude the presence of additional identical elements in processes, methods, items, or devices that include the specified element.

It can be known from the above background art that in power systems with collaborative distribution network and microgrid, physical coupling exists between the distribution network and microgrid, while they are managed separately. Existing optimal power flow algorithms for the distribution and microgrid collaborative system typically assume that the distribution network and microgrid share the same objective. However, this assumption is reasonable only when the distribution network and microgrid belong to the same operator. In recent years, with the development of microgrids, many regions have seen situations where distribution networks and microgrids are managed by different operators. Currently, most calculations are based on cooperative models, and when interests conflict, microgrid interests are generally prioritized. As a result, the final optimization outcome is not a Pareto optimal point, leading to unnecessary cost losses.

Therefore, the embodiments of the present invention provide a method for optimal power flow calculation in power systems based on generalized Nash equilibrium. It uses the results of optimization under non-cooperative conditions as constraint conditions to solve the optimal power flow model under cooperative conditions. By considering individual interests while also taking into account overall interests, this method enhances optimization outcomes.

Figure 1:
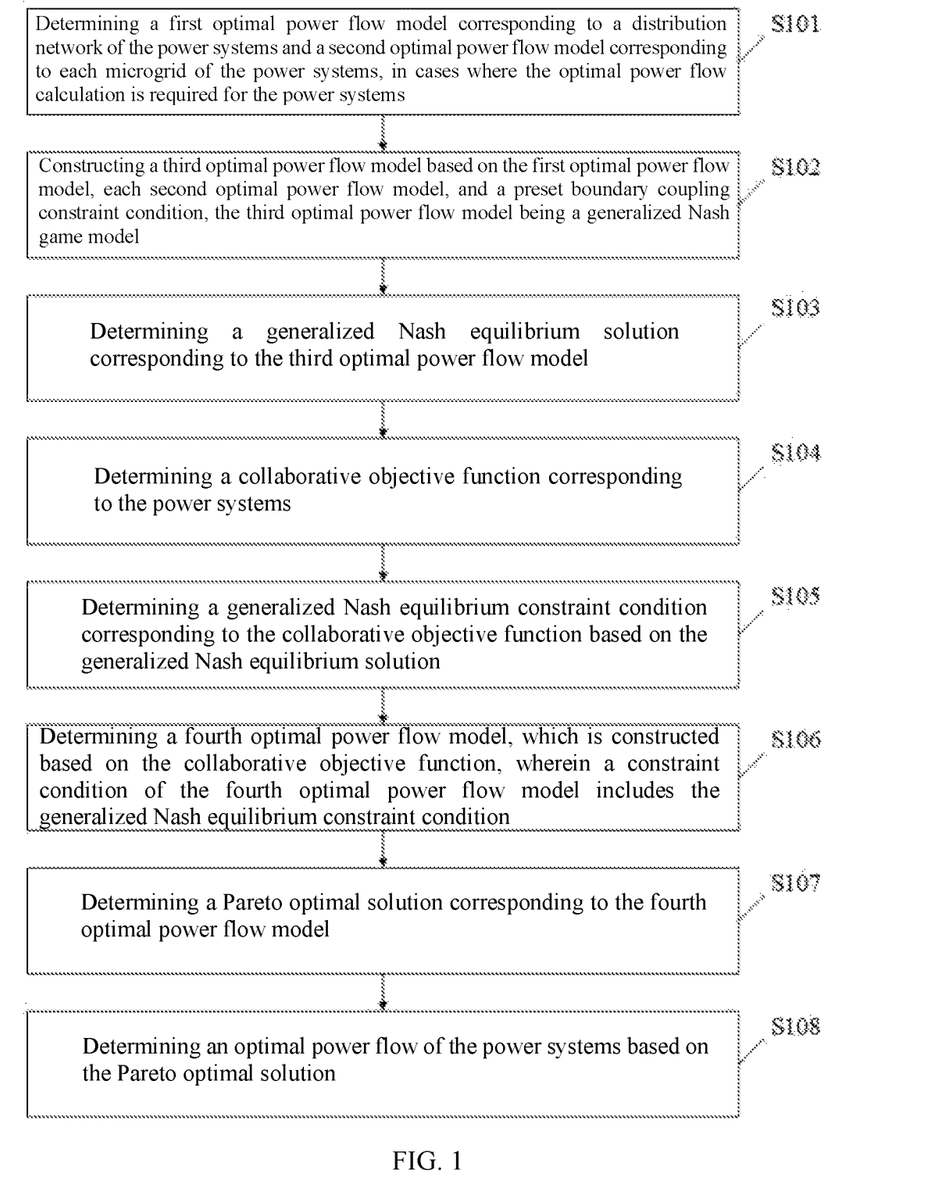
FIG. 1 is a flowchart illustrating a method for optimal power flow calculation in power systems based on generalized Nash equilibrium according to an embodiment of the present invention.

The embodiments of the present invention provide a method for optimal power flow calculation in power systems based on generalized Nash equilibrium, which can be applied to an optimal power flow calculation system. The executing entity of this method can be a processor running on a computer. The flowchart of the method is shown in FIG. 1 and includes:

S101: a first optimal power flow model corresponding to a distribution network of the power systems and a second optimal power flow model corresponding to each microgrid of the power systems are determined, in cases where the optimal power flow calculation is to be done for the power systems.

The first optimal power flow model is constructed based on an objective function corresponding to the distribution network, and the second optimal power flow model corresponding to each microgrid is constructed based on an objective function corresponding to the microgrid. The term "power systems" refers to systems supplying power through collaborative coupled distribution networks and microgrids. When it is necessary to calculate the optimal power flow of the power systems, the power systems can be divided into a distribution network system and a microgrid system based on the connection structure of distribution networks and microgrids in the power systems. Typically, the distribution network in the power systems is connected to multiple microgrids, so the microgrid system is generally composed of multiple microgrids.

In the method provided in the embodiment of the present invention, the connection points between the distribution network and microgrid are treated as the management object of the optimal power flow model. On the distribution network side, separation points (i.e., connection points) are considered as PV nodes which refer to nodes with known voltage and injected active power. On the microgrid side, the separation points are considered as Points of Common Coupling (PCC). Then, an objective function is designed for the distribution network system, which corresponds to the distribution network. An objective function is designed for each microgrid in the microgrid system, thus obtaining objective function corresponding to each microgrid. Specifically, the objective function for each object can be designed based on a control variable, a state variable, and a boundary node state variable of the object. The control variable can be active and reactive power of a generator, the state variable can be a node voltage, phase angle, and the like, and the objective represented by the objective function can be cost, among others. Based on the optimization objective, the optimal power flow model corresponding to the distribution network and the optimal power flow model corresponding to each microgrid, i.e., the first optimal power flow model and each second optimal power flow model, are constructed based on the objective function corresponding to the distribution network and the objective function corresponding to each microgrid, respectively.

S102: a third optimal power flow model is constructed based on the first optimal power flow model, each second optimal power flow model, and a preset boundary coupling constraint condition, the third optimal power flow model being a generalized Nash game model.

In the method provided in the embodiment of the present invention, the boundary coupling constraint condition can be set based on the connection points between the microgrid and the distribution network. The boundary coupling constraint condition represents the constraint between the boundary node state variables of the microgrid and the distribution network. Specifically, the preset boundary coupling constraint condition can be expressed as follows:

$$x_B^{dist} = \left[ \left(x_B^{mg1}\right)^T \ \left(x_B^{mg2}\right)^T \ \ldots \ \left(x_B^{mgN}\right)^T \right]^T \quad \text{(Formula 1)}$$

$$y_B^{dist} = \left[ \left(y_B^{mg1}\right)^T \ \left(y_B^{mg2}\right)^T \ \ldots \ \left(y_B^{mgN}\right)^T \right]^T \quad \text{(Formula 2)}$$

Where "dist" represents the distribution network, "$mg_i$" represents the i-th microgrid, "$x_B^{dist}$" represents the boundary node state variable corresponding to the distribution network, "$x_B^{mg1}$" represents the boundary node state variable corresponding to the first microgrid, "$x_B^{mg2}$" represents the boundary node state variable corresponding to the second microgrid, and so on, up to "$x_B^{mgn}$", which represents the boundary node state variable corresponding to the Nth microgrid, where N is the total number of microgrids. "$y_B^{dist}$" represents the boundary node power injection corresponding to the distribution network, "$y_B^{mg1}$" represents the boundary node power injection corresponding to the first microgrid, "$y_B^{mg2}$" represents the boundary node power injection corresponding to the second microgrid, and so on, up to "$y_B^{mgN}$", which represents the boundary node power injection corresponding to the Nth microgrid.

In the method provided in the embodiment of the present invention, using the boundary coupling constraint condition, the first optimal power flow model, and each second optimal power flow model as the basic model expression, a non-cooperative generalized Nash game model is constructed based on a non-cooperative generalized Nash game strategy, in which the distribution network and each microgrid are treated as players, and the generalized Nash game model is used as the third optimal power flow model. The non-cooperative generalized Nash game strategy is a known type of game strategy and is not detailed here.

S103: a generalized Nash equilibrium solution corresponding to the third optimal power flow model is determined.

In the method provided in the embodiment of the present invention, by solving the third optimal power flow model, the corresponding optimal solution for this model can be obtained. The obtained optimal solution can be considered as the generalized Nash equilibrium solution, i.e., an optimization strategy for all players when the optimization objectives of all players reach the generalized Nash equilibrium, including the optimization strategy for the distribution network and each microgrid. The third optimal power flow model can be solved using conventional optimization problem-solving algorithms.

S104: a collaborative objective function corresponding to the power systems is determined.

In the method provided in the embodiment of the present invention, the collaborative objective function can be set based on their specific needs. The collaborative objective function is constructed from the perspective of coordinated cooperation between the distribution network and each microgrid. For example, the collaborative objective function can be created by adding the objective function corresponding to the distribution network to the objective function of each microgrid.

S105: a generalized Nash equilibrium constraint condition corresponding to the collaborative objective function is determined based on the generalized Nash equilibrium solution.

In the method provided in the embodiment of the present invention, the generalized Nash equilibrium constraint condition is set by constraining the entities within the collaborative objective function based on the generalized Nash equilibrium solution.

S106: a fourth optimal power flow model, which is constructed based on the collaborative objective function, is determined, wherein a constraint condition of the fourth optimal power flow model includes the generalized Nash equilibrium constraint condition.

In the method provided in the embodiment of the present invention, using the generalized Nash equilibrium constraint condition as the constraint condition for the model, an optimal power flow model corresponding to the collaborative objective function is constructed, which is used as the fourth optimal power flow model. The fourth optimal power flow model is constructed based on the global state of the power systems.

S107: a Pareto optimal solution corresponding to the fourth optimal power flow model is determined.

By solving the fourth optimal power flow model, the corresponding optimal solution for this model can be obtained. The obtained optimal solution can be considered as the Pareto optimal solution. Solving the fourth optimal power flow model can be achieved using existing optimization problem-solving algorithms.

S108: an optimal power flow of the power systems based on the Pareto optimal solution is determined.

The optimization strategy in the Pareto optimal solution obtained through the fourth optimal power flow model can be used as the optimization management strategy for achieving optimal power flow, which results in the power flow distribution of the power systems.

According to the method provided in the embodiments of the present invention, which comprises: determining a first optimal power flow model corresponding to a distribution network of the power systems and a second optimal power flow model corresponding to each microgrid of the power systems, in cases where the optimal power flow calculation is to be done for the power systems, wherein the first optimal power flow model is constructed based on an objective function corresponding to the distribution network, and the second optimal power flow model corresponding to each microgrid is constructed based on an objective function corresponding to the microgrid; constructing a third optimal power flow model based on the first optimal power flow model, each second optimal power flow model, and a preset boundary coupling constraint condition, the third optimal power flow model being a generalized Nash game model; determining a generalized Nash equilibrium solution corresponding to the third optimal power flow model; determining a collaborative objective function corresponding to the power systems; determining a generalized Nash equilibrium constraint condition corresponding to the collaborative objective function based on the generalized Nash equilibrium solution; determining a fourth optimal power flow model, which is constructed based on the collaborative objective function, wherein a constraint condition of the fourth optimal power flow model includes the generalized Nash equilibrium constraint condition; determining a Pareto optimal solution corresponding to the fourth optimal power flow model; and determining an optimal power flow of the power systems based on the Pareto optimal solution.

Accordingly, during the calculation of the optimal power flow, the individual interests of both the distribution network and microgrid are taken into consideration while promoting overall optimization. The calculation outcomes are closer to practical requirements, which makes for improving the effectiveness of optimization management.

Based on the method depicted in FIG. 1, the step S101 of determining a first optimal power flow model corresponding to a distribution network of the power systems and a second optimal power flow model corresponding to each microgrid of the power systems comprises:

determining a first optimization objective, which is set based on the objective function corresponding to the distribution network;

determining a first feasible region corresponding to the distribution network, wherein the first feasible region is associated with a power injection of boundary nodes corresponding to the distribution network;

determining a variable constraint condition corresponding to the distribution network, wherein the variable constraint condition corresponding to the distribution network represents a range of values for optimization variables corresponding to the distribution network being the first feasible region, and the optimization variables corresponding to the distribution network include a control variable, a state variable, and a boundary node state variable corresponding to the distribution network; and using the first optimization objective and the variable constraint condition corresponding to the distribution network as the first optimal power flow model corresponding to the distribution network.

In the method provided in the embodiment of the present invention, the first optimization objective is established based on the objective function corresponding to the distribution network. Specifically, the mathematical expression for the first optimization objective can be as follows:

$$\min_{u^{dist}, x^{dist}, x_B^{dist}} c^{dist}(u^{dist}, x^{dist}, x_B^{dist}) \quad \text{(Formula 3)}$$

Where "$c^{dist}$" represents the objective function corresponding to the distribution network, "$u^{dist}$" represents the control variable corresponding to the distribution network, "$x^{dist}$" represents the state variable corresponding to the distribution network, and the meanings of other parameters are the same as those of the corresponding parameters in Formula 1, as described earlier.

In the method provided in the embodiment of the present invention, based on the boundary node power injection corresponding to the distribution network, the feasible region is determined, and the equality constraint is constructed between the optimization variables and the feasible region. Specifically, the mathematical expression for the variable constraint condition corresponding to the distribution network can be as follows:

$$\text{s.t.} \ (u^{dist}, x^{dist}, x_B^{dist}) \in \Omega^{dist}(y_B^{dist}) \quad \text{(Formula 4)}$$

Where "$\Omega^{dist}$" represents the feasible region (the first feasible region) corresponding to the distribution network, and the meanings of other parameters are the same as those of the corresponding parameters in Formulas 2 and 3, as explained earlier.

In the method provided in the embodiment of the present invention, the mathematical expression for the first optimal power flow model is as shown in Formulas 3 and 4.

For each microgrid, a second optimization objective corresponding to the microgrid is determined, wherein the second optimization objective is set based on the objective function corresponding to the microgrid.

For each microgrid, a second feasible region corresponding to the microgrid is determined, wherein the second feasible region is associated with a state variable of a boundary node corresponding to the microgrid.

For each microgrid, a variable constraint condition corresponding to the microgrid is determined, wherein the variable constraint condition represents a range of values for optimization variables corresponding to the microgrid being the second feasible region corresponding to the microgrid, and the optimization variables corresponding to the microgrid include a control variable, a state variable, and a power injection of a boundary node corresponding to the microgrid.

For each microgrid, the second optimization objective and variable constraint condition corresponding to the microgrid are used for the second optimal power flow model corresponding to the microgrid.

Based on the objective function corresponding to each microgrid, the second optimization objective corresponding to the microgrid is established. The mathematical expression for the second optimization objective corresponding to the i-th microgrid can be as follows:

$$\min_{u^{mg_i}, x^{mg_i}, y_B^{mg_i}} c^{mg_i}(u^{mg_i}, x^{mg_i}, x_B^{mg_i}) \quad \text{(Formula 5)}$$

Where "$c^{mg_i}$" represents the objective function corresponding to the i-th microgrid, "$u^{mg_i}$" represents the control variable corresponding to the i-th microgrid, "$x^{mg_i}$" represents the state variable corresponding to the i-th microgrid, and the meanings of other parameters are the same as those of the corresponding parameters in Formulas 1 and 2, as described earlier, which are not described here for brevity.

In the method provided in the embodiment of the present invention, based on the boundary node state variable corresponding to the microgrid, the feasible region is determined, and the equality constraint is constructed between the optimization variables and the feasible region. Specifically, the mathematical expression for the variable constraint condition corresponding to the i-th microgrid can be as follows:

$$\text{s.t.} \ (u^{mg_i}, x^{mg_i}, y_B^{mg_i}) \in \Omega^{mg_i}(x_B^{mg_i}) \quad \text{(Formula 6)}$$

Where "$\Omega^{mg_i}$" represents the feasible region (the second feasible region) corresponding to the i-th microgrid, and the meanings of other parameters are the same as those of the corresponding parameters in Formulas 2 and 5, as explained earlier, which are not described here for brevity.

Figure 2:
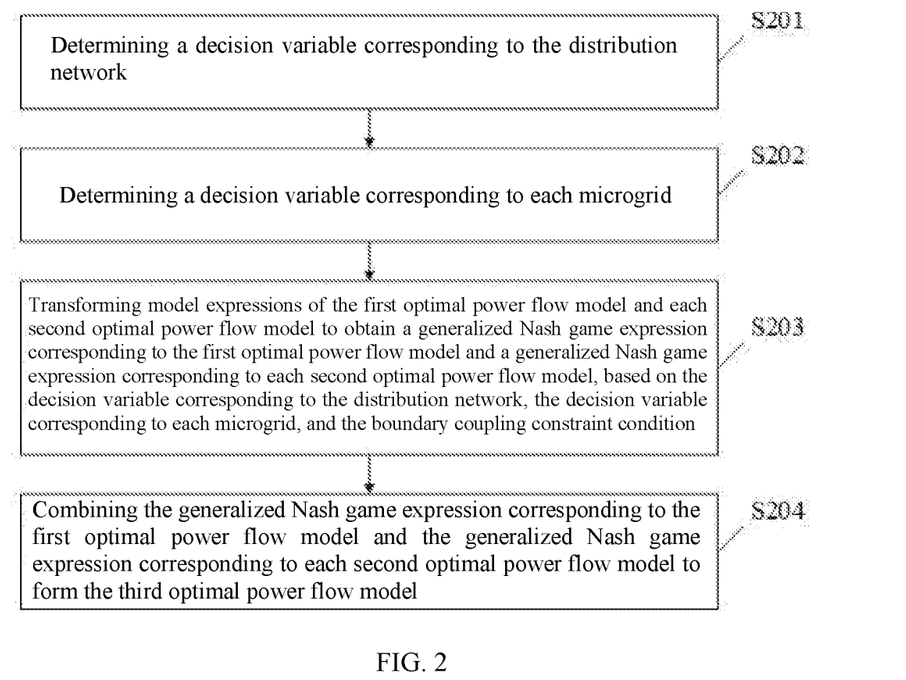
FIG. 2 is another flowchart illustrating a method for optimal power flow calculation in power systems based on generalized Nash equilibrium according to an embodiment of the present invention.

In the method provided in the embodiment of the present invention, the mathematical expression for the second optimal power flow model is shown in Formulas 5 and 6. Based on the method illustrated in FIG. 1, the embodiment of the present invention provides another method for optimal power flow calculation in power systems based on generalized Nash equilibrium, as shown in FIG. 2. The step S102 of constructing a third optimal power flow model based on the first optimal power flow model, each second optimal power flow model, and a preset boundary coupling constraint condition comprises:

S201: a decision variable corresponding to the distribution network is determined.

In the method provided in the embodiment of the present invention, based on the first optimal power flow model and the boundary coupling constraint condition, the decision variable is defined for the distribution network. Specifically, given the models and conditions represented in Formulas 1 to 6, the expression for the decision variable "$s^{dist}$" corresponding to the distribution network is as follows:

$$s^{dist} = \left[ (u^{dist})^T \ (x^{dist})^T \ (x_B^{dist})^T \ (y_B^{dist})^T \right]^T \quad \text{(Formula 7)}$$

S202: a decision variable corresponding to each microgrid is determined.

In the method provided in the embodiment of the present invention, based on the second optimal power flow model and the boundary coupling constraint condition, the decision variable is defined for each microgrid. Specifically, given the models and conditions represented in Formulas 1 to 6, the expression for the decision variable "$s^{mg_i}$" corresponding to the i-th microgrid is as follows:

$$s^{mg_i} = \left[ (u^{mg_i})^T \ (x^{mg_i})^T \ (x_B^{mg_i})^T \ (y_B^{mg_i})^T \right]^T \quad \text{(Formula 8)}$$

The meanings of the parameters in Formulas 7 and 8 are the same as those of the corresponding parameters in Formulas 1 to 6, as explained earlier, which are not described here for brevity.

S203: model expressions of the first optimal power flow model and each second optimal power flow model are transformed to obtain a generalized Nash game expression corresponding to the first optimal power flow model and a generalized Nash game expression corresponding to each second optimal power flow model, based on the decision variable corresponding to the distribution network, the decision variable corresponding to each microgrid, and the boundary coupling constraint condition.

In the method provided in the embodiment of the present invention, by expressing the first optimal power flow model and each second optimal power flow model with the various defined decision variables, the generalized Nash game expressions corresponding to each of these optimal power flow models, i.e., the model expressions represented by the decision variables, can be obtained.

S204: the generalized Nash game expression corresponding to the first optimal power flow model and the generalized Nash game expression corresponding to each second optimal power flow model are combined to form the third optimal power flow model.

In the method provided in the embodiment of the present invention, based on Formulas 1 to 8, the mathematical expression for the third optimal power flow model $\Gamma$ can be as follows:

$$\Gamma := \begin{cases} \min_{s^{dist}} c^{dist}(s^{dist}, s^{-dist}) \\ \text{s.t.} \ s^{dist} \in \Omega^{dist}(s^{-dist}) \\ \min_{s^{mg_i}} c^{mg_i}(s^{mg_i}, s^{dist}) \\ \text{s.t.} \ s^{mg_i} \in \Omega^{mg_i}(s^{dist}), \ i = 1, 2, \ldots, N \end{cases} \quad \text{(Formula 9)}$$

Where "$s^{-dist}$" represents the decision variable corresponding to all microgrids.

Based on the method depicted in FIG. 1, the step S103 of determining a generalized Nash equilibrium solution corresponding to the third optimal power flow model comprises:
solving the third optimal power flow model using a preset alternating iterative algorithm to obtain a solution of the third optimal power flow model, which is used as the generalized Nash equilibrium solution.

In the method provided in the embodiment of the present invention, the alternating iterative algorithm is preset for solving the optimal power flow problem. The third optimal power flow model is solved using the alternating iterative algorithm, resulting in the generalized Nash equilibrium solution. The alternating iterative algorithm refers to an algorithm for solving optimization problems in a distributed manner through data exchange and alternating iterations, such as using traditional fixed-point iteration methods.

Based on Formulas 1 to 9, the third optimal power flow model $\Gamma$ is solved using the alternating iterative algorithm, and the generalized Nash equilibrium point is obtained: ($\bar{s}^{dist}$, $\bar{s}^{mg_1}$, ..., $\bar{s}^{mg_N}$), denoted as GNE($\Gamma$). GNE($\Gamma$) satisfies the following conditions:

$$\begin{cases} \bar{c}^{dist} = c^{dist}(\bar{s}^{dist}, \bar{s}^{-dist}) \leq c^{dist}(s^{dist}, \bar{s}^{-dist}), \\ \forall s^{dist} \in \Omega^{dist}(\bar{s}^{-dist}) \\ \bar{c}^{mg_i} = c^{mg_i}(\bar{s}^{mg_i}, \bar{s}^{dist}) \leq c^{mg_i}(s^{mg_i}, \bar{s}^{dist}), \\ \forall s^{mg_i} \in \Omega^{mg_i}(\bar{s}^{dist}), i = 1, 2, ..., N \end{cases} \quad \text{(Formula 10)}$$

Based on the method depicted in FIG. 1, the step S105 of determining a generalized Nash equilibrium constraint condition corresponding to the collaborative objective function based on the generalized Nash equilibrium solution comprises:
determining, in the collaborative objective function, an objective subfunction corresponding to the distribution network and an objective subfunction corresponding to each microgrid; and
determining an objective function value corresponding to the distribution network and an objective function value corresponding to each microgrid, based on the generalized Nash equilibrium solution.

In the method provided in the embodiment of the present invention, based on Formulas 1 to 10, the collaborative objective function can be expressed as follows:

$$c^{dist}(u^{dist}, x^{dist}, x_B) + \sum_{i=1}^{N} c^{mg_i}(u^{mg_i}, x^{mg_i}, x_B^{mg_i}) \quad \text{(Formula 11)}$$

Where the function on the left of the sign "+" represents the objective subfunction corresponding to the distribution network, and the function within the summation symbol represents the objective subfunction corresponding to each microgrid.

In the method provided in the embodiment of the present invention, the generalized Nash equilibrium solution obtained by solving the third optimal power flow model is substituted into the objective function of the third optimal power flow model. The function values of each objective function at the generalized Nash equilibrium solution are used as the corresponding objective function values for each entity, which yields the objective function value corresponding to the distribution network and the objective function value corresponding to each microgrid.

Further, a generalized Nash equilibrium constraint corresponding to the distribution network is determined, wherein the generalized Nash equilibrium constraint corresponding to the distribution network represents a function value of the objective subfunction corresponding to the distribution network being less than or equal to the objective function value corresponding to the distribution network.

A generalized Nash equilibrium constraint corresponding to each microgrid is then determined, wherein the generalized Nash equilibrium constraint corresponding to each microgrid represents a function value of the objective subfunction corresponding to the microgrid being less than or equal to the objective function value corresponding to the microgrid.

In the method provided in the embodiment of the present invention, the constraint is applied to the objective subfunction corresponding to the distribution network based on the objective function value corresponding to the distribution network, and the constraint is applied to the objective subfunction corresponding to the microgrid based on the objective function value corresponding to the microgrid. Specifically, based on Formula 11, the expression for the generalized Nash equilibrium constraint corresponding to the distribution network can be as follows:

$$c^{dist}(u^{dist}, x^{dist}, x_B) \leq \bar{c}^{dist} \quad \text{(Formula 12)}$$

The expression for the generalized Nash equilibrium constraint corresponding to the microgrid can be as follows:

$$c^{mg_i}(u^{mg_i}, x^{mg_i}, x_B^{mg_i}) \leq \bar{c}^{mg_i}, 1 \leq i \leq N \quad \text{(Formula 13)}$$

Where "$x_B$" is expressed as follows:

$$x_B = [x_B^{mg_1}; x_B^{mg_2}; ...; x_B^{mg_N}] \quad \text{(Formula 14)}$$

As explained earlier, "$\bar{c}^{dist}$" represents the objective function value corresponding to the optimal decision variable of the distribution network, "$\bar{c}^{mg_i}$" represents the objective function value corresponding to the optimal decision variable of the i-th microgrid, and the meanings of other parameters can be found in the previous explanations for Formulas 1 to 11, which are not described here for brevity.

The generalized Nash equilibrium constraint corresponding to the distribution network and the generalized Nash equilibrium constraint corresponding to each microgrid are used as the generalized Nash equilibrium constraint condition corresponding to the collaborative objective function.

Based on the method depicted in FIG. 1, the step S106 of determining a fourth optimal power flow model comprises:
determining a third optimization objective, which is set based on the collaborative objective function;
determining a global equality constraint condition and a global inequality constraint condition corresponding to the collaborative objective function; and
combining the third optimization objective, the global equality constraint condition, the global inequality constraint condition, and the generalized Nash equilibrium constraint condition to form the fourth optimal power flow model.

In the method provided in the embodiment of the present invention, the optimization objective is constructed based on the collaborative objective function to obtain the third optimization objective. According to the optimization requirements of the power systems, the global equality constraint condition and global inequality constraint condition are defined. The global equality constraint condition, the global inequality constraint condition, and the generalized Nash equilibrium constraint condition are used as the constraints, and the third optimization objective is used as the target, which leads to the construction of the corresponding optimal power flow model, which is the fourth optimal power flow model.

Based on Formulas 1 to 14, the expression for the fourth optimal power flow model in the method provided in the embodiment of the present invention can be as follows:

$$\min_{u^{dist}, x^{dist}, x_B, u^{mg}, x^{mg}} c^{dist}(u^{dist}, x^{dist}, x_B) + \qquad \text{(Formula 15)}$$

$$\sum_{i=1}^{N} c^{mg_i}(u^{mg_i}, x^{mg_i}, x_B^{mg_i})$$

s.t. $f^{dist}(u^{dist}, x^{dist}, x_B) = 0$ \qquad (Formula 16)

$g^{dist}(u^{dist}, x^{dist}, x_B) \geq 0$ \qquad (Formula 17)

$f^{mg_i}(u^{mg_i}, x^{mg_i}, x_B^{mg_i}) = 0, 1 \leq i \leq N$ \qquad (Formula 18)

$g^{mg_i}(u^{mg_i}, x^{mg_i}, x_B^{mg_i}) \geq 0, 1 \leq i \leq N$ \qquad (Formula 19)

$f_B(u^{dist}, x^{dist}, u^{mg}, x^{mg}, x_B) = 0$ \qquad (Formula 20)

$c^{dist}(u^{dist}, x^{dist}, x_B) \leq \bar{c}^{dist}$ \qquad (Formula 12)

$c^{mg_i}(u^{mg_i}, x^{mg_i}, x_B^{mg_i}) \leq \bar{c}^{mg_i}, 1 \leq i \leq N$ \qquad (Formula 13)

Where "f" represents the global equality constraint, "g" represents the global inequality constraint, and the superscripts or subscripts of "f" and "g" denote the respective entities. The expressions for "$u^{mg}$" and "$x^{mg}$" are as follows:

$u^{mg} = [u^{mg_1}; u^{mg_2}; \ldots ; u^{mg_N}]$ \qquad (Formula 21)

$x^{mg} = [x^{mg_1}; x^{mg_2}; \ldots ; x^{mg_N}]$ \qquad (Formula 22)

Based on the method depicted in FIG. 1, the step S107 of determining a Pareto optimal solution corresponding to the fourth optimal power flow model comprises:

solving the fourth optimal power flow model using a preset heterogeneous decomposition algorithm to obtain a solution of the fourth optimal power flow model, which is used as the Pareto optimal solution.

In the method provided in the embodiment of the present invention, a heterogeneous decomposition (HGD) algorithm is preset. The fourth optimal power flow model is solved using the HGD algorithm in a distributed manner. The iterative solution eventually converges to the Pareto optimal point, and this solution is considered as the Pareto optimal solution corresponding to the fourth optimal power flow model. The HGD algorithm is an existing algorithm and is not detailed here.

Figure 3:
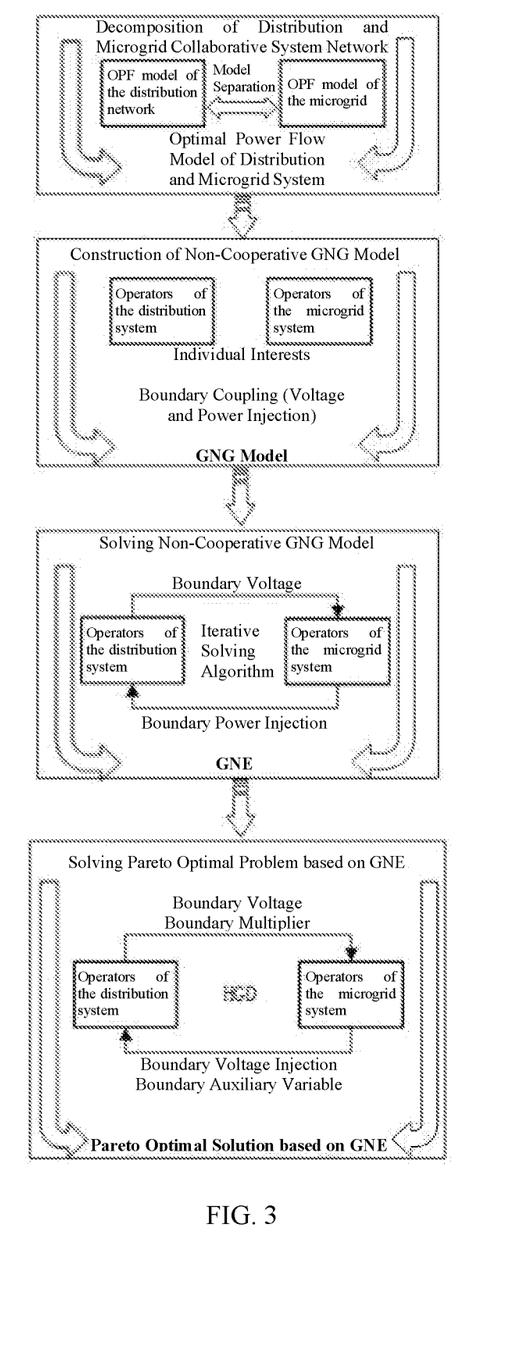
FIG. 3 is an example diagram illustrating the process of optimal power flow calculation in power systems based on generalized Nash equilibrium according to an embodiment of the present invention.

To better illustrate the method provided in the embodiment of the present invention, combined with the example shown in FIG. 3, another method for optimal power flow calculation in power systems based on generalized Nash equilibrium is provided in the embodiment of the present invention.

As shown in FIG. 3, the calculation process provided in the embodiment of the present invention mainly includes steps such as decomposition of a distribution and microgrid collaborative system network, construction of an optimal power flow model for the distribution and microgrid system, construction of a non-cooperative generalized Nash game model, solving the generalized Nash game model, construction of a collaborative optimal power flow model for the distribution and microgrid based on GNE, and solving the collaborative optimal power flow model for the distribution and microgrid based on GNE. The calculation process provided in the embodiment of the present invention mainly includes the following steps:

Decomposition of Distribution and Microgrid Collaborative System Network:

In the method provided in the embodiment of the present invention, without loss of generality, it is assumed that there are N microgrids connected to the distribution network. The distribution-and-microgrid collaborative system is separated from the connection points. At the distribution network side, the separation points are considered as PV nodes and are managed by the optimal power flow model of the distribution network. At the microgrid side, the separation points are considered as PCC nodes and are managed by the optimal power flow model of the microgrid.

Construction of Optimal Power Flow Model for Distribution and Microgrid System:

In the method provided in the embodiment of the present invention, the optimal power flow model for the distribution and microgrid system is constructed by separating the optimal power flow model of the distribution network and the optimal power flow model of the microgrid. The expression for the optimal power flow model corresponding to the distribution network is as shown in Formulas 3 and 4. The expression for the optimal power flow model corresponding to the i-th microgrid is as shown in Formulas 5 and 6. The optimal power flow model for the distribution network represents the individual interests of the distribution (distribution network) system operator, while the optimal power flow model for the microgrid represents the individual interests of the microgrid system operator. The boundary coupling is established through the voltage and power injection, and the boundary coupling constraint is as shown in Formulas 1 and 2.

Construction of Non-Cooperative Generalized Nash Game Model:

The decision variable, as shown in Formulas 7 and 8, is defined, and therefore, the optimal power flow model for the distribution and microgrid system established in the previous step can be represented as the model shown in Formula 9, namely the GNG model.

Solving Generalized Nash Game Model:

The GNG model $\Gamma$ is solved using an alternating iterative algorithm to obtain the generalized Nash equilibrium point, denoted as GNE($\Gamma$), which satisfies the condition shown in Formula 10. In the solving process, boundary voltage and boundary power injection are associated with the distribution system operator and microgrid system operator.

Construction of Collaborative Optimal Power Flow Model for Distribution and Microgrid Based on GNE:

The centralized optimal power flow model based on GNE($\Gamma$) can be represented as the model shown in Formulas 12 to 22.

Solving Collaborative Optimal Power Flow Model for Distribution and Microgrid Based on GNE:

Using the Heterogeneous Decomposition (HGD) algorithm, the model established in the previous step is solved in a distributed manner, obtaining the Pareto optimal point after iterative solving. In the solving process, the boundary voltage, boundary multiplier, boundary voltage injection, and boundary auxiliary variable are associated with the distribution system operator and microgrid system operator.

By separating the distribution network and microgrid coupled system, a non-cooperative optimal power flow model is established and solved to achieve the generalized Nash equilibrium point, satisfying the individual interests of different operators managing microgrids and distribution networks and addressing the shortcomings of bias in benefit allocation in traditional cooperative models. On the other hand, a two-level solving algorithm is proposed, using the generalized Nash equilibrium point as a performance constraint to establish and solve the collaborative optimal power flow model for the distribution and microgrid based on GNE, obtaining the Pareto optimal point of the coupled system, meeting individual interests for each operator while optimizing overall operational costs.

Correspondingly to the method for optimal power flow calculation in power systems based on the generalized Nash equilibrium shown in FIG. 1, the embodiment of the present invention further provides a device for optimal power flow calculation in power systems based on generalized Nash equilibrium for implementing the method shown in FIG. 1. The structural diagram of the device is shown in FIG. 4, which comprises:

- a first determination unit 301 for determining a first optimal power flow model corresponding to a distribution network of the power systems and a second optimal power flow model corresponding to each microgrid of the power systems, in cases where the optimal power flow calculation is to be done for the power systems, wherein the first optimal power flow model is constructed based on an objective function corresponding to the distribution network, and the second optimal power flow model corresponding to each microgrid is constructed based on an objective function corresponding to the microgrid;
- a construction unit 302 for constructing a third optimal power flow model based on the first optimal power flow model, each second optimal power flow model, and a preset boundary coupling constraint condition, the third optimal power flow model being a generalized Nash game model;
- a second determination unit 303 for determining a generalized Nash equilibrium solution corresponding to the third optimal power flow model;
- a third determination unit 304 for determining a collaborative objective function corresponding to the power systems;
- a fourth determination unit 305 for determining a generalized Nash equilibrium constraint condition corresponding to the collaborative objective function based on the generalized Nash equilibrium solution;
- a fifth determination unit 306 for determining a fourth optimal power flow model, which is constructed based on the collaborative objective function, wherein a constraint condition of the fourth optimal power flow model includes the generalized Nash equilibrium constraint condition;
- a sixth determination unit 307 for determining a Pareto optimal solution corresponding to the fourth optimal power flow model; and
- a seventh determination unit 308 for determining an optimal power flow of the power systems based on the Pareto optimal solution.

According to the device provided in the embodiment of the present invention, a first optimal power flow model corresponding to a distribution network of the power systems and a second optimal power flow model corresponding to each microgrid of the power systems are determined, in cases where the optimal power flow calculation is to be done for the power systems; a third optimal power flow model is constructed based on the first optimal power flow model, each second optimal power flow model, and a preset boundary coupling constraint condition, the third optimal power flow model being a generalized Nash game model; a generalized Nash equilibrium solution corresponding to the third optimal power flow model is determined; a collaborative objective function corresponding to the power systems is determined; a generalized Nash equilibrium constraint condition corresponding to the collaborative objective function is determined based on the generalized Nash equilibrium solution; a fourth optimal power flow model, which is constructed based on the collaborative objective function, is determined, wherein a constraint condition of the fourth optimal power flow model includes the generalized Nash equilibrium constraint condition; determining a Pareto optimal solution corresponding to the fourth optimal power flow model; and an optimal power flow of the power systems is determined based on the Pareto optimal solution. By using the device according to the embodiments of the present invention, the generalized Nash equilibrium point is firstly solved using the non-cooperative optimal power flow model for the distribution network and microgrid, then the generalized Nash equilibrium point is used to establish corresponding a constraint. Based on the constraint, a collaborative optimal power flow model for the distribution network and microgrid is constructed and solved to obtain the Pareto optimal point for the optimal power flow model. During the calculation of the optimal power flow, not only the individual interests of the distribution network and of the microgrid are considered, but also the overall optimization is taken into consideration. Thus, the calculation outcomes are closer to practical requirements, which makes for improving the effectiveness of optimization management.

Figure 4:
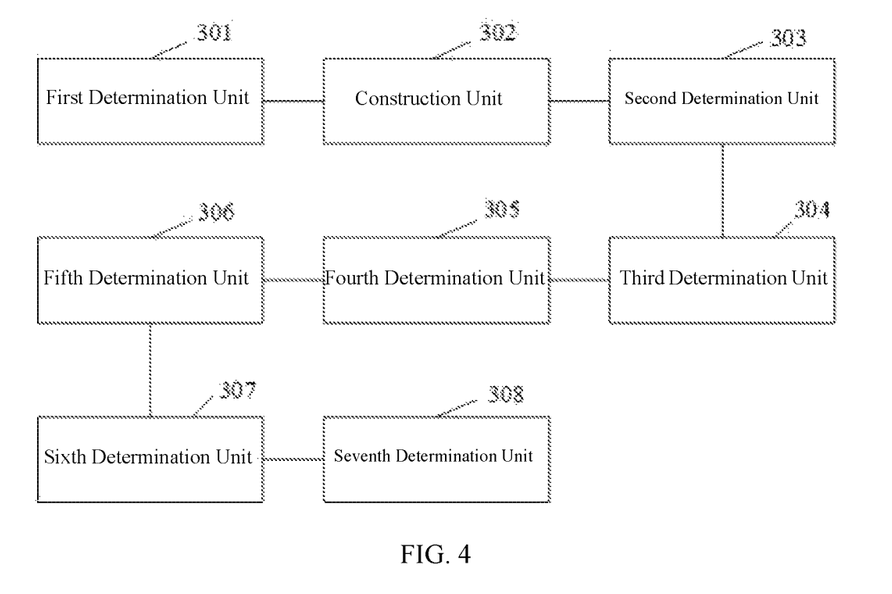
FIG. 4 is a schematic diagram illustrating the structure of a device for optimal power flow calculation in power systems based on generalized Nash equilibrium according to an embodiment of the present invention.
Figure 5:
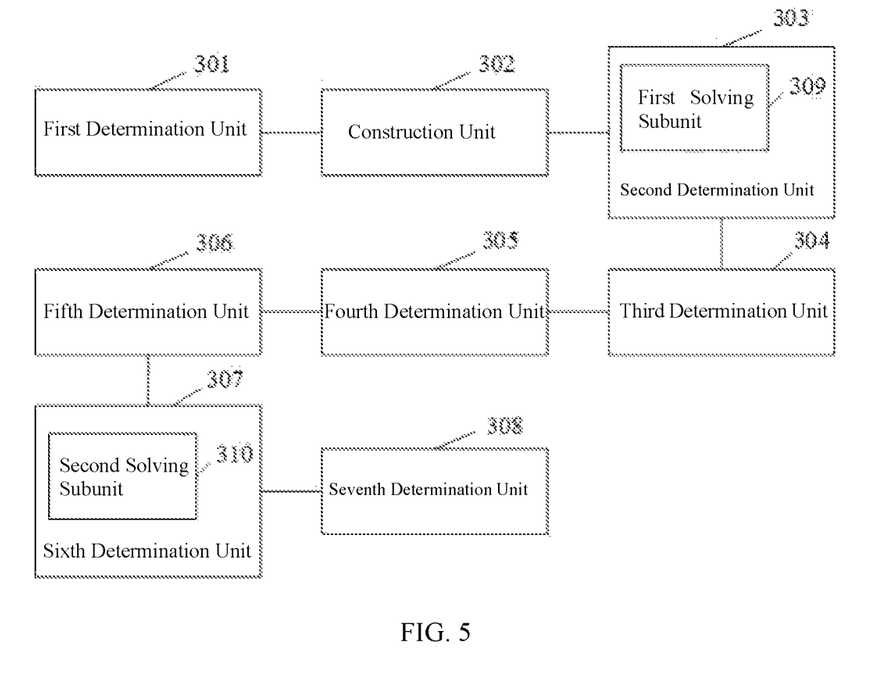
FIG. 5 is another schematic diagram illustrating the structure of a device for optimal power flow calculation in power systems based on generalized Nash equilibrium according to an embodiment of the present invention.

On the basis of the device shown in FIG. 4, the embodiment of the present invention provides another device for optimal power flow calculation in power systems based on generalized Nash equilibrium, the structural diagram of which is shown in FIG. 5. In the device provided in the embodiment of the present invention, the second determination unit 303 comprises:

- a first solving subunit 309 for solving the third optimal power flow model using a preset alternating iterative algorithm to obtain a solution of the third optimal power flow model, which is used as the generalized Nash equilibrium solution.

In the device provided in the embodiment of the present invention, the sixth determination unit 307 comprises:

- a second solving subunit 310 for solving the fourth optimal power flow model using a preset heterogeneous decomposition algorithm to obtain a solution of the fourth optimal power flow model, which is used as the Pareto optimal solution.

On the basis of the device illustrated in FIG. 4, the device provided in the embodiment of the present invention can further expand into multiple units. The functions of each unit can be referred to in the descriptions provided in the previous embodiments for the method for optimal power flow calculation in an electrical system based on the generalized Nash equilibrium, and therefore, further examples are not provided here.

The various embodiments in this specification are described progressively, with common or similar elements among different embodiments cross-referenced. Each embodiment primarily highlights the differences from the other embodiments. Particularly for systems or system embodiments, which are fundamentally similar to method embodiments, the description is kept relatively simple. For details regarding the common aspects, please refer to the relevant sections in the method embodiments. The described systems and system embodiments are illustrative only, and units identified as separate components may or may not be physically separated. Components presented as units may or may not be physical entities. They can be located in one place or distributed across multiple network units. Parts or all of the modules can be chosen based on actual requirements to achieve the objectives of the present embodiment. Those skilled in the art can understand and implement them without paying inventive labor.

Furthermore, the exemplary units and algorithm steps described in the embodiments disclosed in the present application can be implemented using electronic hardware, computer software, or a combination of both. To clearly illustrate the interchangeability of hardware and software, the composition and steps of various examples have been described in a generic manner based on functionality. Whether these functions are executed in a hardware or software manner depends on the specific application and design constraints of the technical solution. Different methods can be used by the specialist to implement the described functions for each specific application, but such implementation should not be considered beyond the scope of the present invention.

The purpose of the above description of the embodiments is to enable those skilled in the art to implement or use the present invention. Various modifications to these embodiments will be apparent to those skilled in the art. The general principles defined herein can be implemented in other embodiments without departing from the spirit or scope of the invention. Therefore, the present invention is not limited to the embodiments shown in the present application but is intended to cover the broadest scope consistent with the principles and novel features disclosed in the present application.

The invention claimed is:

1. A method for optimal power flow calculation in power systems based on generalized Nash equilibrium, the power systems including a distribution network and microgrids which are physically coupled but managed independently, the method being performed by a processor of a system for optimal power flow calculation, comprising:

separately constructing a first optimal power flow model corresponding to the distribution network and a second optimal power flow model corresponding to each microgrid, in cases where the optimal power flow calculation is to be done by the processor for the power systems, wherein the first optimal power flow model is constructed using the processor based on a first objective function corresponding to the distribution network, and the second optimal power flow model corresponding to each microgrid is constructed using the processor based on a second objective function corresponding to the microgrid, wherein the first objective function corresponding to the distribution network is based on a control variable, a first state variable, and a boundary node state variable of the distribution network, wherein the control variable of the distribution network is active and reactive power of a generator in the distribution network, the first state variable of the distribution network is a voltage and phase angle of nodes in the distribution network, excluding boundary nodes, and the boundary node state variable of the distribution network is a voltage and phase angle of boundary nodes of the distribution network, and wherein the second objective function corresponding to the microgrid is based on a control variable, a second state variable, and a boundary node state variable of the microgrid, wherein the control variable of the microgrid is active and reactive power of a generator in the microgrid, the second state variable of the microgrid is a voltage and phase angle of nodes in the microgrid, excluding boundary nodes, and the boundary node state variable of the microgrid is a voltage and phase angle of boundary nodes of the microgrid;

constructing a third optimal power flow model using the processor which is based on the first optimal power flow model, each second optimal power flow model, and a preset boundary coupling constraint condition, the third optimal power flow model being a non-cooperative generalized Nash game model, wherein the preset boundary coupling constraint condition includes a constraint between the boundary node state variable of the distribution network and the boundary node state variable of each microgrid, and a constraint between a boundary node power injection of the distribution network and a boundary node power injection of each microgrid;

using the processor in determining a generalized Nash equilibrium solution of the distribution network and each microgrid in a non-cooperative state corresponding to the third optimal power flow model;

setting a collaborative objective function carried out by the processor, and corresponding to the distribution network and each microgrid in a cooperative state, the collaborative objective function being obtained by adding the first objective function of the distribution network to the second objective function of each microgrid;

determining a generalized Nash equilibrium constraint condition in the non-cooperative state based on the generalized Nash equilibrium solution;

constructing a fourth optimal power flow model based on the collaborative objective function in the cooperative state and the generalized Nash equilibrium constraint condition in the non-cooperative state;

determining a Pareto optimal solution corresponding to the fourth optimal power flow model; and adjusting control variables including output power of generators and tap settings of controllable transformers in the distribution network and each microgrid in the power systems based on the fourth optimal power flow model by transmitting control signals to the controllable transformers in the distribution network and each microgrid in the power systems.

2. The method according to claim 1, wherein the step of constructing a first optimal power flow model corresponding to the distribution network and a second optimal power flow model corresponding to each microgrid comprises:
- determining a first optimization objective which is set based on the objective function corresponding to the distribution network;
- determining a first feasible region corresponding to the distribution network, wherein the first feasible region is associated with a power injection of boundary nodes corresponding to the distribution network;
- determining a variable constraint condition corresponding to the distribution network, wherein the variable constraint condition corresponding to the distribution network represents a range of values for optimization variables corresponding to the distribution network being the first feasible region, and the optimization variables corresponding to the distribution network include a control variable, a state variable, and a boundary node state variable corresponding to the distribution network;
- using the first optimization objective and the variable constraint condition corresponding to the distribution network as the first optimal power flow model corresponding to the distribution network;
- determining, for each microgrid, a second optimization objective corresponding to the microgrid, wherein the second optimization objective is set based on the objective function corresponding to the microgrid;
- determining, for each microgrid, a second feasible region corresponding to the microgrid, wherein the second feasible region is associated with a state variable of a boundary node corresponding to the microgrid;
- determining, for each microgrid, a variable constraint condition corresponding to the microgrid, wherein the variable constraint condition represents a range of values for optimization variables corresponding to the microgrid being the second feasible region corresponding to the microgrid, and the optimization variables corresponding to the microgrid include a control variable, a state variable, and a power injection of a boundary node corresponding to the microgrid; and
- using, for each microgrid, the second optimization objective and variable constraint condition corresponding to the microgrid as the second optimal power flow model corresponding to the microgrid.

3. The method according to claim 1, wherein the step of constructing a third optimal power flow model based on the first optimal power flow model, each second optimal power flow model, and a preset boundary coupling constraint condition comprises:
- determining a decision variable corresponding to the distribution network;
- determining a decision variable corresponding to each microgrid;
- transforming model expressions of the first optimal power flow model and each second optimal power flow model to obtain a generalized Nash game expression corresponding to the first optimal power flow model and a generalized Nash game expression corresponding to each second optimal power flow model, based on the decision variable corresponding to the distribution network, the decision variable corresponding to each microgrid, and the boundary coupling constraint condition; and
- combining the generalized Nash game expression corresponding to the first optimal power flow model and the generalized Nash game expression corresponding to each second optimal power flow model to form the third optimal power flow model.

4. The method according to claim 1, wherein the step of determining a generalized Nash equilibrium solution corresponding to the third optimal power flow model comprises:
- solving the third optimal power flow model using a preset alternating iterative algorithm to obtain a solution of the third optimal power flow model, which is used as the generalized Nash equilibrium solution.

5. The method according to claim 1, wherein the step of determining a generalized Nash equilibrium constraint condition corresponding to the collaborative objective function based on the generalized Nash equilibrium solution comprises:
- determining, in the collaborative objective function, an objective subfunction corresponding to the distribution network and an objective subfunction corresponding to each microgrid;
- determining an objective function value corresponding to the distribution network and an objective function value corresponding to each microgrid, based on the generalized Nash equilibrium solution;
- determining a generalized Nash equilibrium constraint corresponding to the distribution network, wherein the generalized Nash equilibrium constraint corresponding to the distribution network represents a function value of the objective subfunction corresponding to the distribution network being less than or equal to the objective function value corresponding to the distribution network;
- determining a generalized Nash equilibrium constraint corresponding to each microgrid, wherein the generalized Nash equilibrium constraint corresponding to each microgrid represents a function value of the objective subfunction corresponding to the microgrid being less than or equal to the objective function value corresponding to the microgrid; and
- using the generalized Nash equilibrium constraint corresponding to the distribution network and the generalized Nash equilibrium constraint corresponding to each microgrid as the generalized Nash equilibrium constraint condition corresponding to the collaborative objective function.

6. The method according to claim 1, wherein the step of constructing a fourth optimal power flow model comprises:
- determining a third optimization objective which is set based on the collaborative objective function;
- determining a global equality constraint condition and a global inequality constraint condition corresponding to the collaborative objective function; and
- combining the third optimization objective, the global equality constraint condition, the global inequality constraint condition, and the generalized Nash equilibrium constraint condition to form the fourth optimal power flow model.

7. The method according to claim 1, wherein the step of determining a Pareto optimal solution corresponding to the fourth optimal power flow model comprises:
- solving the fourth optimal power flow model using a preset heterogeneous decomposition algorithm to obtain a solution of the fourth optimal power flow model which is used as the Pareto optimal solution.

8. A device for optimal power flow calculation in power systems based on generalized Nash equilibrium, the power systems including a distribution network and microgrids which are physically coupled but managed independently, the device comprising a processor comprising:

a first construction unit for separately constructing a first optimal power flow model corresponding to the distribution network and a second optimal power flow model corresponding to each microgrid, in cases where the optimal power flow calculation is to be done by the processor for the power systems, wherein the first optimal power flow model is constructed using the processor based on a first objective function corresponding to the distribution network, and the second optimal power flow model corresponding to each microgrid is constructed using the processor based on a second objective function corresponding to the microgrid, wherein the first objective function corresponding to the distribution network is based on a control variable, a first state variable, and a boundary node state variable of the distribution network, wherein the control variable of the distribution network is active and reactive power of a generator in the distribution network, the first state variable of the distribution network is a voltage and phase angle of nodes in the distribution network, excluding boundary nodes, and the boundary node state variable of the distribution network is a voltage and phase angle of boundary nodes of the distribution network, and wherein the second objective function corresponding to the microgrid is based on a control variable, a second state variable, and a boundary node state variable of the microgrid, wherein the control variable of the microgrid is active and reactive power of a generator in the microgrid, the second state variable of the microgrid is a voltage and phase angle of nodes in the microgrid, excluding boundary nodes, and the boundary node state variable of the microgrid is a voltage and phase angle of boundary nodes of the microgrid;

a second construction unit for constructing a third optimal power flow model using the processor based on the first optimal power flow model, each second optimal power flow model, and a preset boundary coupling constraint condition, the third optimal power flow model being a non-cooperative generalized Nash game model, wherein the preset boundary coupling constraint condition includes a constraint between the boundary node state variable of the distribution network and the boundary node state variable of each microgrid, and a constraint between a boundary node power injection of the distribution network and a boundary node power injection of each microgrid;

a first determination unit for determining a generalized Nash equilibrium solution of the distribution network and each microgrid in a non-cooperative state corresponding to the third optimal power flow model;

a second determination unit for setting a collaborative objective function corresponding to the distribution network and each microgrid in a cooperative state, the collaborative objective function being obtained by adding the first objective function of the distribution network to the second objective function of each microgrid;

a third determination unit for determining a generalized Nash equilibrium constraint condition in the non-cooperative state based on the generalized Nash equilibrium solution;

a third construction unit for constructing a fourth optimal power flow model based on the collaborative objective function in the cooperative state and the generalized Nash equilibrium constraint condition in the non-cooperative state;

a fourth determination unit for determining a Pareto optimal solution corresponding to the fourth optimal power flow model; and an adjustment unit for adjusting control variables including output power of generators and tap settings of controllable transformers in the distribution network and each microgrid in the power systems based on the fourth optimal power flow model by transmitting control signals to the controllable transformers in the distribution network and each microgrid in the power systems.

9. The device according to claim 8, wherein the first determination unit comprises:
a first solving subunit for solving the third optimal power flow model using a preset alternating iterative algorithm to obtain a solution of the third optimal power flow model, which is used as the generalized Nash equilibrium solution.

10. The device according to claim 8, wherein the fourth determination unit comprises:
a second solving subunit for solving the fourth optimal power flow model using a preset heterogeneous decomposition algorithm to obtain a solution of the fourth optimal power flow model, which is used as the Pareto optimal solution.

* * * * *